UNITED STATES PATENT OFFICE.

CALEB LYONS SWAYZE, OF MOBILE, ALABAMA.

PACKING AND LUBRICATING COMPOUND.

SPECIFICATION forming part of Letters Patent No. 601,180, dated March 22, 1898.

Application filed July 8, 1896. Serial No. 598,495. (No specimens.)

*To all whom it may concern:*

Be it known that I, CALEB LYONS SWAYZE, a citizen of the United States, residing at Mobile, in the county of Mobile and State of Alabama, have invented a new and useful Packing and Lubricating Compound, of which the following is a specification.

This invention relates to packing and lubricating compounds; and it has for its object to provide a new and useful compound of the character mentioned which shall be simple and inexpensive and which will develop when subjected to heat-producing conditions of journal-boxes, bearings, axles, &c., a latent quality capable of exerting a very powerful influence in obviating heating of such journals, and thereby prevent accidents, delays, and the like which frequently arise from such source.

With these objects in view the invention consists, substantially, in a compound composed of the following ingredients combined as follows or in any other desirable proportion to meet the requirements of the case: cotton-seed, three parts; cotton, woolen, or other waste, one part, and oil or other lubricant to thoroughly saturate the mass. These ingredients are to be thoroughly mixed by agitation.

The principal use of the above composition is for packing and lubricating the journals of railway rolling-stock; and to this end any desirable quantity of the cotton-seed, together with the cotton, woolen, or other waste, are combined in substantially the proportions stated, the cotton-seed taking the place of the bulk of waste which is ordinarily employed and the portion of waste which is used with the cotton-seed being adapted to prevent the said cotton-seed from becoming clotted or gathered together in knots or balls. When the cotton-seed and the waste have been so combined, oil or other suitable lubricant is mingled with the same and thereby saturates the mass, so that the compound in its completed state and when applied to journals of railway rolling-stock and a similar nature will effectually lubricate the same and prevent heating thereof.

The manner of using and the advantages of the herein-described compound will be apparent to those skilled in the art. When applied to journal-boxes, bearings, axles, &c., the oil will lubricate the same, and in the event that such oil or other lubricant becomes exhausted for any reason the action of the heat generated by the friction produced by the absence of the lubricant upon the cotton-seed will effectually cause the latter to yield its latent oily properties before the journal or bearing shall become sufficiently heated to produce serious results. By reason of this the journal or bearing will be lubricated by said oily properties of the cotton-seed and such journal or bearing will be prevented becoming heated, and from the fact that the whole uncrushed cotton-seed is used in place of the ordinary waste it will be seen that the igniting of such waste, which commonly occurs, will be prevented, as the cotton-seed itself is of such nature as not to be susceptible to igniting and therefore liability to accidents from fire is also overcome.

From the foregoing it will be evident that I have provided a packing and lubricating compound which is simple and inexpensive and that the same will develop when subjected to heat-producing conditions of journal-boxes, bearings, axles, &c., a latent quality capable of exerting a very powerful influence in obviating heating of such journals, and thus accidents, delays, and the like which frequently arise from such source will be prevented.

While I have described the compound as especially adapted for use upon railway rolling-stock, I wish it to be understood that the same may be employed upon journals, bearings, and axles of any description, and, further, that oil or other lubricant of any nature may be employed in connection therewith.

Having thus described the invention, what is claimed as new, and desired to be secured by Letters Patent, is—

A packing and lubricating compound for journals, composed of a bulk of whole uncrushed cotton-seed mixed with waste and oil, substantially as set forth.

In testimony that I claim the foregoing as my own I have hereto affixed my signature in the presence of two witnesses.

CALEB LYONS SWAYZE.

Witnesses:
   A. J. AMOS,
   WM. H. FRY.